US012776964B2

(12) United States Patent
Hiware et al.

(10) Patent No.: US 12,776,964 B2
(45) Date of Patent: Oct. 27, 2026

(54) AIOPERON

(71) Applicant: Oracle International Corporation, Redwood Shores, CA (US)

(72) Inventors: Venkatesh Hiware, Atlanta, GA (US); Akin Ozer, Cankaya/Ankara (TR); Shiladitya Gangopadhyay, West Bengal (IN)

(73) Assignee: Oracle International Corporation, Redwood Shores, CA (US)

( * ) Notice: Subject to any disclaimer, the term of this patent is extended or adjusted under 35 U.S.C. 154(b) by 2 days.

(21) Appl. No.: 19/021,699

(22) Filed: Jan. 15, 2025

(65) Prior Publication Data

US 2026/0205382 A1 Jul. 16, 2026

(51) Int. Cl.

*H04L 41/5009* (2022.01)
*G06F 40/126* (2020.01)
*H04L 41/16* (2022.01)

(52) U.S. Cl.

CPC ........ *H04L 41/5009* (2013.01); *G06F 40/126* (2020.01); *H04L 41/16* (2013.01)

(58) Field of Classification Search

CPC .... H04L 41/5009; H04L 41/16; G06F 40/126
See application file for complete search history.

(56) References Cited

U.S. PATENT DOCUMENTS 7,954,014 B2 5/2011 Wang
2025/0348941 A1* 11/2025 Greenbaum .......... G06Q 40/06

OTHER PUBLICATIONS

Schulz, "Towards Measuring the Degree of Fulfillment of Service Level Agreements" downloaded •\\HPBBFS\Clients\Oracle 50277\6200-6299\6230 Auto MAA Reviews\old\Towards_Measuring_the_Degree_of_Fulfillm.pdf (Sep. 2024).
Duggal et al., "Oracle Cloud: Tips to Maximize Oracle Enterprise Manager Performance and Scalability" (56 pages).
"The Cohere Platform" downloaded May 23, 2024 https://docs.cohere.com/docs/the-cohere-platform (7 pages).
"Conceptual Guide" downloaded May 23, 2024 https://python.langchain.com/v0.2/docs/concepts/ (34 pages).

* cited by examiner

*Primary Examiner* — Suraj M Joshi
(74) *Attorney, Agent, or Firm* — Hickman Becker; Bingham Ledesma LLP

(57) ABSTRACT

Here is artificially intelligent (AI) operations (AIOperon) by a user-facing network element to remedy an operational deficiency of a remote network element in a distributed system such as a data center or a computing cloud. The user-facing network element receives a deficiency text string that indicates an operational deficiency of the remote network element. Based on the deficiency text string and retrieval augmented generation (RAG), a few highly semantically relevant standard operating procedure specifications are contextually selected, and each contains multiple natural language sentences and a few computer commands. A large language model (LLM) processes a linguistic prompt that contains the deficiency text string and the selected standard operating procedure specifications. From the linguistic prompt, the LLM inferentially generates a computer script that contains an inferred sequence of computer commands. Applying the computer script to the remote network element remedies or mitigates the operational deficiency of the remote network element.

20 Claims, 5 Drawing Sheets

AIOPERON

FIELD OF THE INVENTION

The present invention relates to artificially intelligent operations (AIOperon) to remedy an operational deficiency of a remote network element.

BACKGROUND

Runbooks and SOPs (Standard Operating Procedures) are forms of human-readable technical documents for computer administration. Runbooks and SOPs represent and share knowledge, processes, and procedures within an operations organization. Some reference documents contain specific and technical ways of performing information technology (IT) operations tasks. Some reference documents are broader in scope, covering a variety of processes and aiming for consistency and compliance. Some reference documents contain step-by-step instructions and guidance for troubleshooting issues, performing maintenance, or responding to incidents. Some reference documents contain contextual information, including relevant technical details such as a system configuration, dependencies, and error codes.

Some reference documents are incident-oriented for troubleshooting specific incidents or emergencies. Some reference documents focus on compliance and aim to ensure consistent adherence to policies, regulations, and best practices. Some reference documents are process-oriented and focus on documenting repeatable processes and workflows.

If there are hundreds of reference documents, time spent finding a reference document and a likelihood of inaccurately selecting a wrong (e.g. irrelevant) reference document are increased. Herein, accuracy is semantic and linguistic in any of the following example ways. Natural language (NL) processing (NLP) may rely heavily on the structure and patterns of NL to understand and process meaningful text. Diction and phrasing, being the arrangement of words and phrases in a sentence, significantly affect NLP accuracy as discussed herein. In one example, a large language model (LLM) accepts an NL prompt as input. The accuracy of an NL prompt may be measured by measuring the accuracy of an inference caused by the prompt. That is, natural language may be measurably inaccurate. For example, the accuracy of a generated summary is measurable, where the summary is clear prose (i.e. NL) that is inferred from less clear prose by learned summarization.

The following are supervised (i.e. labeled) and unsupervised ways of measuring accuracy of a generated summary. With a labeled dataset, it is possible to measure summary accuracy quantitatively with the following various NL metrics, including metrics similar to Factuality that measures how much of the generated summary is relevant (i.e. signal, not noise). The following are automatic ways to measure accuracy of a summary.

Bilingual Evaluation Understudy (BLEU) has a scale from 0 to 1 where 0 corresponds to complete inaccuracy and 1 to perfect accuracy. The score is calculated based on the number of matching n-grams (multiword short phrases) using a modified n-gram precision and a brevity penalty to prevent biases.

Recall-Oriented Understudy for Gisting Evaluation (ROUGE) is a set of metrics for comparing the desired output and the actual output. It measures the longest matching sequence of words in the two texts.

MPNet measures similarity between two pieces of text as cosine similarity of embedding vectors that represent the text.

The AlignScore metric uses a tuned Robustly Optimized BERT Pretraining Approach (ROBERTa) and a function on the output of the model to output a score between 0 and 1 representing the alignment of two strings of text. This approach is different from the others because it uses an LLM. It uses the embeddings (a compressed representation of the sentence) given as output from the ROBERTa language model.

By the above example accuracy metrics, accuracy of any output text, whether NL or not, generated herein may be quantified, and this accuracy is a performance measurement of an LLM that generated the output text and a performance measurement of internal operation of a computer that hosts the LLM.

DETAILED DESCRIPTION

Figure 1:
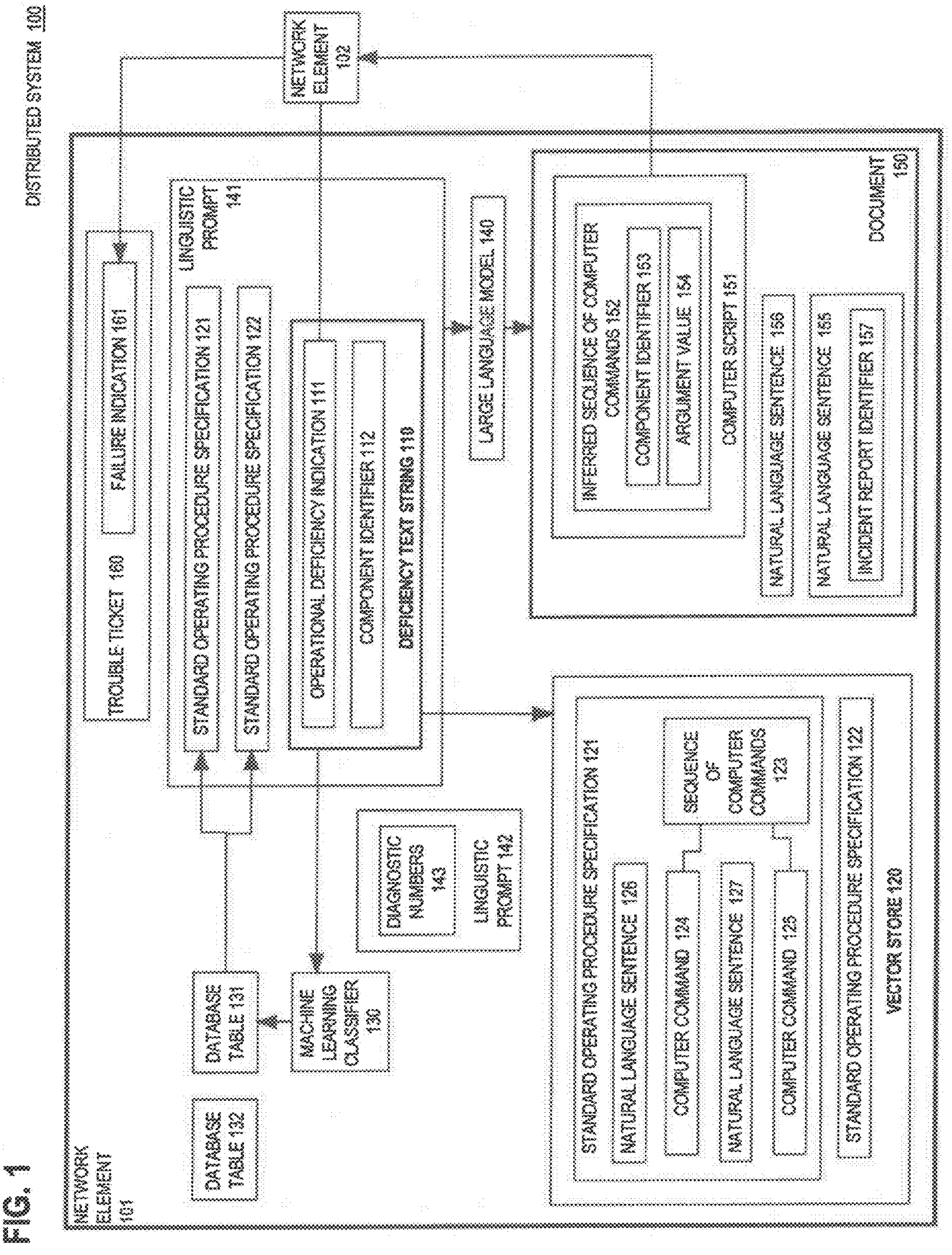
FIG. 1 is a block diagram that depicts, in an example distributed system, an example network element that performs artificially intelligent operations (AIOperon) to remedy an operational deficiency of a remote network element.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Here is artificially intelligent (AI) operations (AIOperon) to remedy an operational deficiency of a remote network element. This is an AI-based tool that assists with searching, diagnosing, resolving, implementing, and triage of operational issues, during which this tool accepts feedback from ongoing or recent execution results as well as input and control from users. This tool combines retrieval based and generative AI techniques to troubleshoot and fix common issues in a semiautomatic way with opportunities for interactive intervention such as editing, embellishing, authorizing, delaying, or canceling proposed diagnostics and repairs before the proposed activities begin. For an actual scenario such as an operational deficiency of a computer or its software, herein is a way to find highly semantically relevant standard operating procedure(s) and to use the dynamically found literature for inferentially synthesizing manual or automatic instructions that can resolve or mitigate the operational deficiency. This is an innovative way to expedite problem resolution for information technology (IT) operations.

Herein, bidirectional encoder representations for transformers (BERT) and generative pretrained transformer (GPT) are interchangeable or equivalent opensource implementations of a large language model (LLM) that is a deep neural network (DNN) that already was known pretrained for general natural language (NL) processing (NLP). Some of the LLMs herein already were further supervised finetuned to: a) semantically comprehend standard operating procedure documentation and b) fluently read and write computer scripting commands, and this fluency does not require analyzing or generating a sequence of more than a few (e.g. only one or up to ten) computer commands.

Herein is novel prompt engineering that increases or even, as discussed later herein, maximizes generative LLM accuracy. In a retrieval augmented generation (RAG) embodiment, a multidimensional vector store performs semantic lookup to find documentation that is semantically most similar (i.e. relevant) to a current operational problem. A separate encoder LLM inferentially generates a fixed-size dense semantic encoding of a (e.g. extremely) minimal description of an operational problem, and the vector store accepts the semantic encoding as a semantic lookup key for discovering the most relevant documentation and operating procedures. Insertion of the few most relevant reference documents directly into an engineered prompt maximizes the accuracy of scripting commands and related natural language that the generative LLM herein infers. In turn, increased accuracy of generatively inferred text facilitates accelerated correction of an operating computer. An inferentially generated computer script herein reflects the reliability and uniformity of reference commands in available reference documents, and deployment of the computer script can be confidently expedited by a continuous development pipeline such as Jenkins.

1.0 Example Distributed System Contains Multiple Network Elements

FIG. 1 is a block diagram that depicts, in example distributed system 100, network element 101 that performs artificially intelligent operations (AIOperon) to remedy an operational deficiency of network element 102. Distributed system 100 contains one or more computers (not shown) such as a rack server such as a blade, a mainframe, or a virtual computer. In various structural embodiments, one or each of network elements 101-102 is: a) a computer, a virtual machine, or an executing image in an application containerization container such as Docker or b) a reprogrammable network device such as a network switch, a network router, or a firewall. All components shown in network element 101 may be respectively stored and operated in volatile or nonvolatile storage of network element 101. In various topological embodiments: a) network elements 101-102 are connected by a rack backplane, a local area network (LAN), or an internetwork such as a wide area network (WAN); b) network elements 101-102 are components in a same physical computer; or c) one of network elements 101-102 is a physical computer and the other of network elements 101-102 is a component in that computer.

1.1 Standard Operating Procedure Specification

Network element 102 may experience an operational deficiency of various severity such as an outage, an exception, a backlog, latency, computer resource depletion, or a departure from a best practice such as embodied in standard operating procedure specifications 121-122. Each of standard operating procedure specifications 121-122 contains (e.g. informal) natural language prose such as multiple natural sentences 126-127 or natural paragraphs, and this natural language describes (i.e. teaches) technology semantics including more or less exactly how and why to use one or multiple computer commands (e.g. 124-125) that are text commands (e.g. console command line or shell command) to remedy (i.e. resolve or mitigate) a specific operational deficiency of a kind of network elements. As shown, natural sentences 126-127 may be sequentially interleaved with computer commands 124-125.

Each of standard operating procedure specifications 121-122 may be a human-readable document in any of various formats such as a text file, a word processor file, or a webpage. Network element 101 can: a) process each of standard operating procedure specifications 121-122 as text and b) separately inspect or extract each of text components 124-127. Herein, text components 110-112, 121-127, 141-143, and 150-157 are text or can be processed as text.

1.2 Indication of Operational Deficiency of Remote Network Element

Deficiency text string 110 is text that indicates an operational deficiency of network element 102. For example, operational deficiency indication 111 may be text in any of: a) console output, b) a log entry in an operational log or audit log, c) a diagnostic report or alert, d) a trouble ticket, e) an email or a speech transcript. In an embodiment, a user interactively enters deficiency text string 110 into network element 101 such as: a) freehand natural language from scratch, b) copy/paste verbatim from, for example, console output, or c) a mix of both (a)-(b). For example, the value of operational deficiency indication 111 may be "ORA-01403", and the interactively entered value of deficiency text string 110 may be "can you give some information about ORA-01403 error", where "you" means large language model (LLM) 140. In an embodiment, network element 101 instead automatically (i.e. not interactively) receives or retrieves deficiency text string 110.

In various examples in which deficiency text string 110 is interactively received, deficiency text string 110 may be any of: a) a natural language question, b) natural language from: a trouble ticket, an instant message, or an email, c) a console error message, d) a sequence of text lines from a console log, e) a single lexical token such as "ORA-01403", and f) a text string that does not contain an identifier of any of: network element 102, a network port of network element 102, and a computer that contains network element 102.

In this example, LLM 140 is a deep neural network that was already trained to: a) accept in input and reason about (i.e. inferentially analyze) text such as components 110-112, 121-122, and 141 and b) responsively inferentially generate a mix of natural language sentences 155-156 and computer script 151 that is not natural language, and that mix may be in an inferentially generated data structure such as document 150 that may be any kind of document herein such as a webpage in a web browser. Examples of computer script 151 include a shell script, a python script, a JavaScript, and a standard query language (SQL) script. In an example, network element 101 contains a web server that can send document 150 to a remote user, and that web server may, for example, have previously interactively received deficiency text string 110 in a hypertext transfer protocol (HTTP) Post request from the user's web browser.

The following is an example of natural languages sentences 155-156.

ORA-01403 is a common error in Oracle Database environments that occurs when an attempt is made to modify a read-only cursor. Here's some information about this error:

Cause: The ORA-01403 error is thrown when an attempt is made to modify a cursor that was defined with the READ ONLY attribute. This attribute specifies that the cursor cannot be modified.

The following is an example computer script 151 that is a SQL script.

Example: Suppose you Have a Cursor That Retrieves Data From a Table:

sql DECLARE CURSOR c_department IS

SELECT*FROM departments; BEGIN OPEN c_department; LOOP FETCH c_department INTO department_id, department_name; EXIT WHEN c_department%notfound;

Attempt to Update the department name (Causes ORA-01403) UPDATE departments SET department_name= department_name Il '(Updated)' WHERE department_id= department_id; END LOOP; END;

1.3 Linguistic Prompt Engineering

The following example presumes that one or multiple standard operating procedure specifications 121-122 are highly relevant to the operational deficiency of network element 102. Accurate selection of standard operating procedure specifications 121-122 based on semantic relevance is discussed later herein.

Network element 101 generates linguistic prompt 141 that contains text components 110-112 and 121-122. Operational deficiency indication 111 may, for example, contain any of: an error code, an exception stack trace, a warning containing natural language, a quantitative diagnostic measurement such as a latency, a reported amount of volatile or nonvolatile storage, a backlog size, or a session count. Component identifier 112 is an identifier of any direct or indirect (e.g. grand-) parent or child component in a containment hierarchy that contains network element 102. In various examples, component identifier 112 identifies any of: a) network element 102, b) a component that contains network element 102 such as an application containerization container, virtual machine, or physical computer, or c) a component in network element 102 such as a virtual machine, an application containerization container, a database, a database server, or a database management system (DBMS). In an example, component identifier 112 contains a network port number. Each component identifier herein uniquely identifies a component in either of: a) the containment hierarchy that contains network element 102 or b) distributed system 100.

Linguistic prompt 141 is text that LLM 140 accepts as a whole input, which causes LLM 140 to inferentially generate a mix of natural language and text that is not natural language. That generated mix is a whole output that contains some or all of text components 150-157 as follows. Any whole text herein may be represented as a text string (e.g. character array) or as a sequence of located or extracted lexical tokens that may, for example, be separated by whitespace in the text. Two lexical tokens may or may not be adjacent in the sequence, but no two lexical tokens can overlap (i.e. share a same character at a same location in the character array of the whole text). Each lexical token is a substring of the whole text, and different locations in the text might contain duplicate lexical tokens. Locating or extracting lexical tokens in a text is performed by LLM 140 or network element 101.

1.4 Generative Inferencing by LLM

Herein, bidirectional encoder representations for transformers (BERT) and generative pretrained transformer (GPT) are interchangeable or equivalent opensource implementations of a general-purpose LLM that is a pretrained deep neural network (DNN) for natural language (NL) processing (NLP). LLM 140 already learned by supervised training how words relate to each other syntactically, which aids in comprehension of the overall meaning of a sentence. Internal inferential operation of LLM 140 includes recognizing a subject-verb-object structure that helps LLM 140 infer causes and effects. Internal inferential operation of LLM 140 includes syntactic analysis that provides structural clues that help LLM 140 disambiguate words with multiple meanings by considering the context in which a word is used. In those ways and as follows, LLM 140 semantically comprehends standard operating procedure specifications 121-122.

Each of standard operating procedure specifications 121-122 contains one or more computer commands such as sequence of computer commands 123 that contains computer commands 124-125. Inferred sequence of computer commands 152 is inferred from computer commands in one or both of standard operating procedure specifications 121-122.

Here is an example in which standard operating procedure specifications 121-122 corroborate each other because they contain similar sequences of computer commands that contain a same count, types, and ordering of commands, but with different arguments. Inferred argument values 153-154 may, for example, be command line arguments of a same or different computer command and, in various scenarios: a) neither of inferred argument values 153-154 occur in components 120-122, b) linguistic prompt 141 contains none, one, or both of inferred argument values 153-154, and/or c) component identifiers 112 and 153 do or do not identify a same component.

Here is an example in which the length (i.e. count) of inferred sequence of computer commands 152 is itself inferred and does not match (e.g. is greater than) any length of the sequences of commands in standard operating procedure specifications 121-122. In various scenarios, inferred sequence of computer commands 152 is based on: a) a concatenation or interleaving of two sequences of commands respectively in standard operating procedure specifications 121-122, b) a concatenation or interleaving of subsets of commands from both sequences of commands in standard operating procedure specifications 121-122, and/or c) removal of command(s) from any of (a), (b), or sequence of computer commands 123.

In an example, command line options from similar commands in each of standard operating procedure specifications 121-122 are combined in a command in inferred sequence of computer commands 152. In an example, one or more of text components 151-154 contain a value inferred from natural language sentences 126-127. For example, argument value 154 may be "- - - fast" when natural language 126 is "Use - - - fast for acceleration.", even though none of computer commands 124-125 contain "- - - fast".

In an example, inferred natural language sentences 156-157 each is unique in distributed system 100 and do not occur verbatim or at all in any shown component except generated document 150. In an example not shown, natural language sentence 155 is a line comment or a block comment in inferred sequence of computer commands 152. Natural language sentence 155 may contain incident report identifier 157 that identifies a preexisting incident report, bug ticket, or helpdesk case that already tracks a similar operational deficiency to the one indicated by operational deficiency indication 111. For example, standard operating procedure specification 121 may contain incident report identifier 157.

1.5 Implementation Technicalities

An extended scenario may entail generation of a sequence of multiple distinct linguistic prompts 141-142 and, in some cases, generation of linguistic prompt 142 should not occur until after inferred sequence of computer commands 152 is generated and manually or automatically executed to obtain information needed to generate linguistic prompt 142 or to impose a technology configuration in component 100 or 102 that is a prerequisite of a computer script that will be generatively inferred from linguistic prompt 142. In an example, linguistic prompt 142 contains diagnostic numbers 143 that were obtained by executing computer script 151.

Any failure during execution of computer script 151 may provide failure indication 161 that network element 101 can include in optionally generated trouble ticket 160 that may be an incident report as discussed earlier herein. Failure indication 161 may contain any data discussed above for deficiency text string 110. In an embodiment, unsubmitted trouble ticket 160 is automatically generated and prepopulated by network element 101, and the user may interactively view and edit trouble ticket 160 before interactively submitting trouble ticket 160 or before interactively discarding trouble ticket 160.

1.6 Retrieval Augmented Generation (RAG) Maximizes Accuracy

Generation of text components 141 and 151-157 and operation of LLM 140 are accelerated by including fewer standard operating procedure specifications in linguistic prompt 141. Accuracy of components 140-141 and 151-157 is maximized by retrieval augmented generation (RAG) in which vector store 120 dynamically selects the most relevant standard operating procedure specifications 121-122 as follows. Vector store 120 contains key-value pairs (not shown). The values in vector store 120 are an updatable (i.e. future-proof) corpus of standard operating procedure specifications, and the keys in vector store 120 are fixed-size dense semantic encodings of those specifications as follows.

In an embodiment, an encoder LLM (not shown) inferentially generates a fixed-size encoding from any variable-size input text, and that encoding semantically represents the text as a vector (i.e. one dimensional array) containing multiple numbers. Semantically similar texts have measurably similar encodings. Semantic distance between two texts is measured as vector distance between two encodings. Vector store 120 accepts a fixed-size encoding of a text as a retrieval lookup key, which causes vector store 120 to select and return k nearest neighboring (KNN) standard operating procedure specifications whose encodings are semantically similar to the lookup encoding. Vector store 120 provides semantic lookup, also referred to herein as similarity search. Vector store 120 is prepopulated before any linguistic prompt 141 is generated.

The encoder LLM may dynamically inferentially generate a fixed-size encoding of deficiency text string 110. That dynamically generated encoding is provided as a lookup key to vector store 120 to find matching standard operating procedure specifications. RAG maximizes semantic relevance of dynamically selected standard operating procedure specifications 121-122, which maximizes accuracy of components 140-141 and 151-157.

1.7 RAG by Classification Instead of by Vector Store

Various reasons may prevent storage of all standard operating procedure specifications in vector store 120, such as capacity of vector store 120, frequency of creation or deletion or revision of standard operating procedure specifications, or intended separation of standard operating procedure specifications into subsets such as: a) per customer or infrastructure tenant, b) per architectural tier in an infrastructure stack., or c) per data silo. For example, each customer may have their own set of standard operating procedure specifications that are imperfect (i.e. customized) copies of the standard operating procedure specifications in vector store 120.

Each partition's (e.g. customer's, tier's, or silo's) standard operating procedure specifications may be stored in the partition's own distinct database table in a database in, or accessible by, network element 101, such as database tables 131-132. The encoder LLM discussed above may encode deficiency text string 110 into a fixed-size encoding that machine learning (ML) classifier 130 accepts as a whole input, which causes ML classifier 130 to predict which of database tables 131-132 contains multiple standard operating procedure specifications 121-122 that should be included in linguistic prompt 141. ML classifier 130 was already trained to treat database tables 131-132 as distinct mutually-exclusive classes and to classify a fixed-size encoding as one of those classes.

2.0 Example Artificially Intelligent Operations (AIOperon) Process

Figure 2:
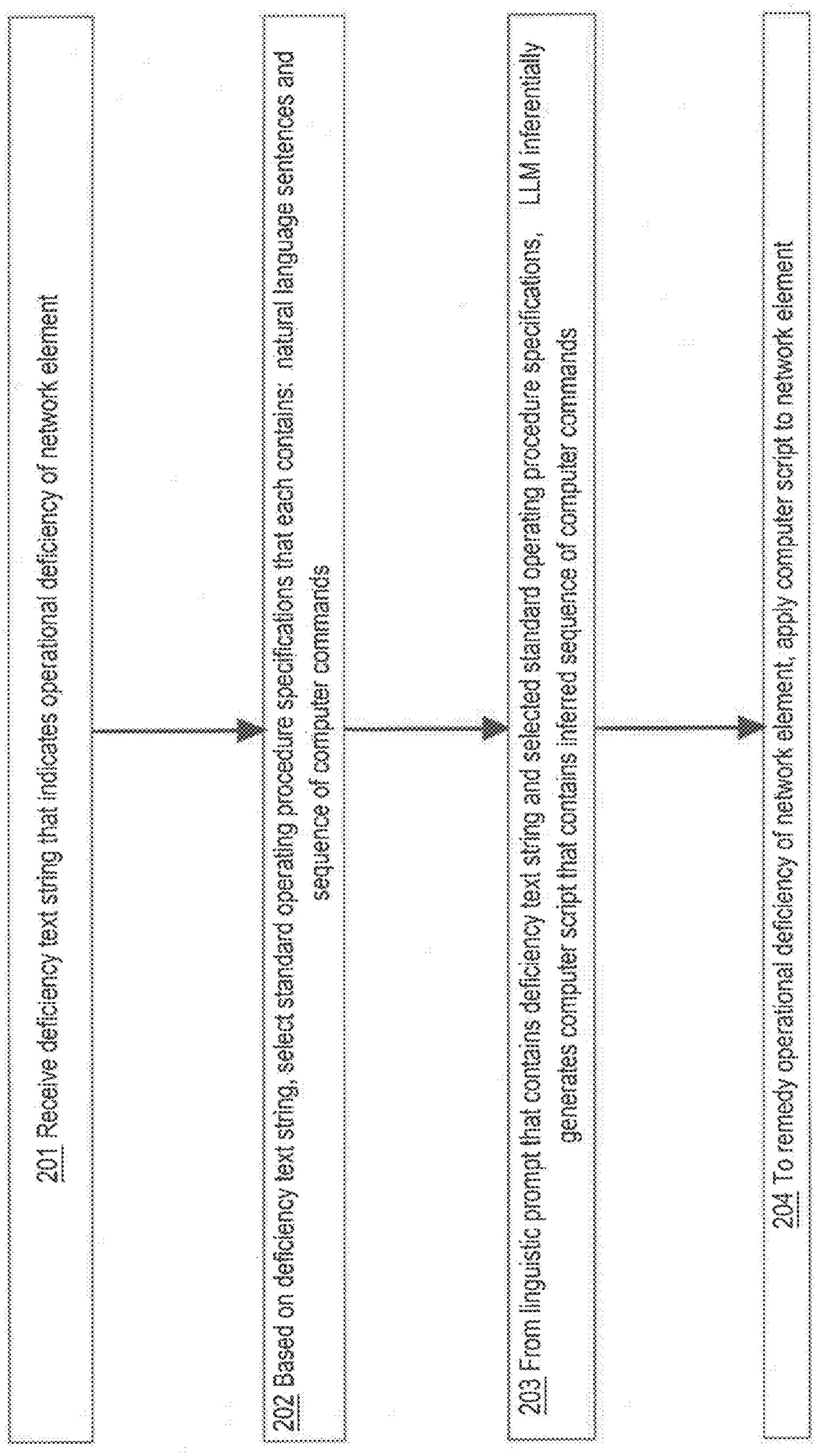
FIG. 2 is a flow diagram that depicts an example artificially intelligent operations (AIOperon) process that a network element may perform to remedy an operational deficiency of a remote network element.

FIG. 2 is a flow diagram that depicts an example artificially intelligent operations (AIOperon) process that network element 101 may perform to remedy an operational deficiency of network element 102.

Step 201 receives deficiency text string 110 that contains operational deficiency indication 111 that indicates an operational deficiency of network element 102. Step 201 may be interactively caused by interactive entry of deficiency text string 110 into network element 101 that may entail a webpage, copying and pasting text, and/or keyboarding as discussed earlier herein. Network element 101 may instead autonomously decide to perform step 201 and may automatically obtain deficiency text string 110 as follows.

Network element 101 may subscribe to, listen for, poll for, or otherwise automatically receive or retrieve: a) diagnostic reports such as health checks and performance monitoring results that characterize operational performance of network element 102 and b) application console output or operational logs from network element 102. From (a)-(b), network element 101 may detect operational deficiency indication

111 and responsively extract deficiency text string 110. Thus, linguistic prompt 141 may be generated in reaction to a manual or autonomous observation. In an embodiment, an autonomously extracted deficiency text string 110 can be: i) interactively edited before inclusion in linguistic prompt 141 or ii) interactively discarded without generating linguistic prompt 141.

Based on deficiency text string 110, step 202 selects one or multiple standard operating procedure specifications 121-122 that each contains as shown in standard operating procedure specification 121: natural language sentences and a sequence of computer commands. Accurate selection of standard operating procedure specifications 121-122 is discussed later for FIG. 3. Linguistic prompt 141 is generated between steps 202-203 as discussed earlier herein.

In step 203, from linguistic prompt 141 that contains deficiency text string 110 and standard operating procedure specifications 121-122 that step 202 selected, large language model (LLM) 140 inferentially generates some or all of text components 150-157 as discussed earlier herein. To remedy the operational deficiency of network element 102, step 204 applies inferentially generated computer script 151 to network element 102 as follows.

In an example, step 204 entails: 1) network element 101 sending computer script 151 to a user's web browser, 2) the user copying computer script 151 from the browser, and 3) pasting and executing the script in a shell in network element 102. The browser may display a webpage that displays computer script 151 and a pushbutton that executes computer script 151 in a shell in network element 102 when the pushbutton is interactively clicked. In a different example, network element 101 automatically causes and automatically performs step 204. That is, step 204 may or may not entail interactivity. In an embodiment, network element 102 contains a continuous development pipeline such as Jenkins that invokes, or is invoked by, step 204.

3.0 Example Artificially Intelligent Operations (AIOperon) Extended Process

Figure 3:
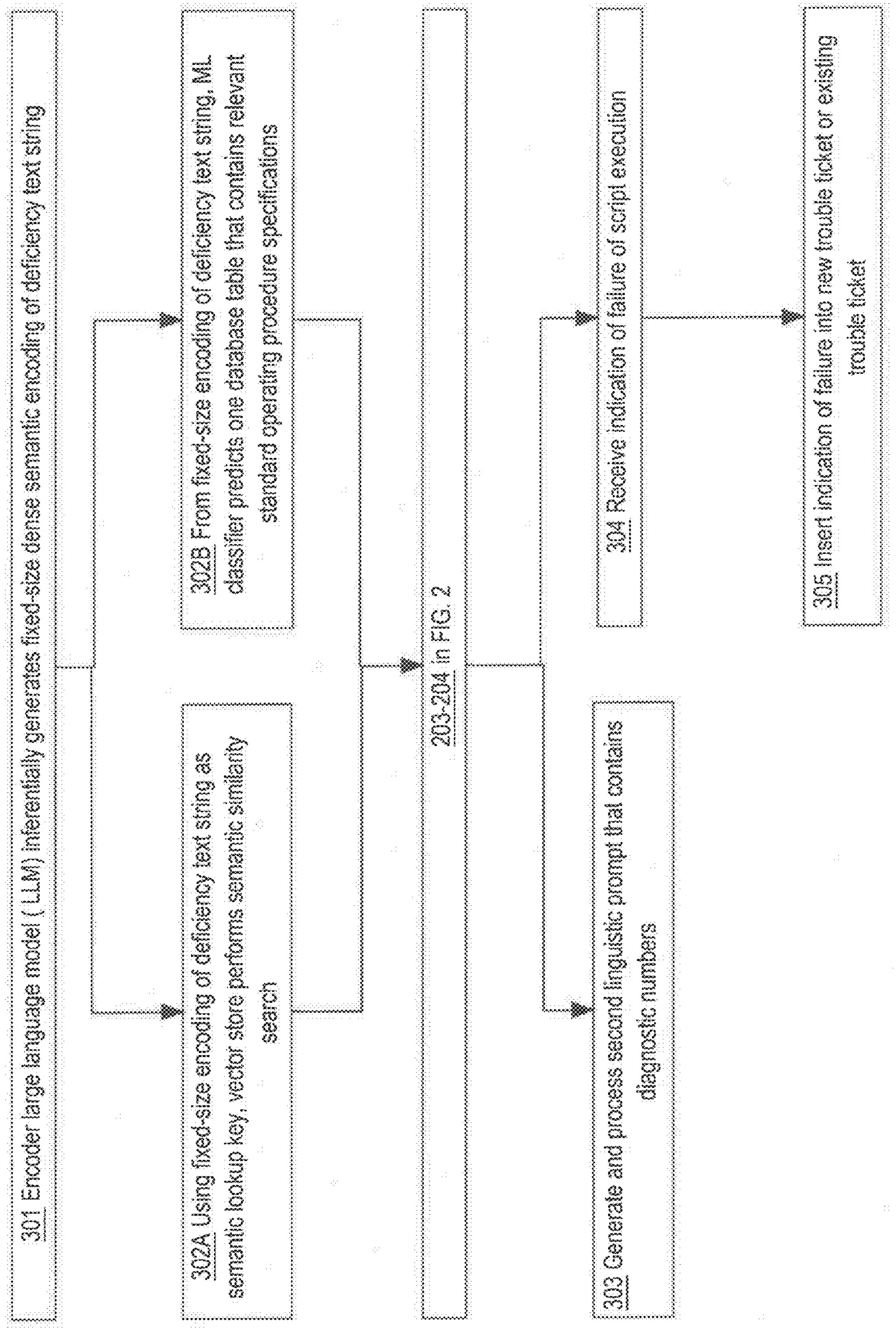
FIG. 3 is a flow diagram that depicts an extended example AIOperon process that a network element may perform to remedy an operational deficiency of a remote network element.

FIG. 3 is a flow diagram that depicts an example artificially intelligent operations (AIOperon) extended process that network element 101 may perform to remedy an operational deficiency of network element 102. The steps of the processes of FIGS. 2-3 may be interleaved into a combined process having the following sequence of steps: 201, 301, 202-204, and 303 or 304-305. In other words, step 201 occurs before the process of FIG. 3 begins, and the process of FIG. 2 ends before step 303 or 304 occurs. As discussed below, steps 302A-B are implementations of step 202.

Accuracy of components 140-141 and 151-157 is increased by selection of standard operating procedure specifications 121-122 that are most semantically relevant to deficiency text string 110. In step 301 the encoder large language model (LLM), which is not LLM 140, inferentially generates a fixed-size dense semantic encoding of deficiency text string 110 as discussed earlier herein. The following are embodiments A-B that select, in distinct respective ways, standard operating procedure specifications 121-122 based on the fixed-size encoding of deficiency text string 110. Embodiment A uses vector store 120, which contains many standard operating procedure specifications, to perform step 202 in FIG. 2 in a way that entails step 302A as part of retrieval augmented generation (RAG). Embodiment B performs step 202 in FIG. 2 in a way that instead uses machine learning (ML) classifier 130 to perform step 302B. In other words, steps 302A-B are implementations of step 202.

In step 302A, vector store 120 uses the fixed-size encoding of deficiency text string 110 as a semantic lookup key. In step 302A, vector store 120 responsively performs a semantic similarity search that matches and returns standard operating procedure specifications 121-122 as discussed earlier herein.

In step 302B, ML classifier 130 processes the fixed-size encoding of deficiency text string 110 as a whole input. For example, the fixed-size encoding may be accepted as a feature vector by ML classifier 130. Out of many similar database tables 131-132 that contain disjoint (i.e. mutually exclusive nonintersecting) subsets from many standard operating procedure specifications, ML classifier 130 predicts one database table 131 that contains relevant standard operating procedure specifications 121-122.

In those ways, embodiments A-B select semantically relevant standard operating procedure specifications 121-122, after which steps 203-204 in FIG. 2 are performed to inferentially generate some or all of text components 150-157. Embodiments A-B may be mutually exclusive or, in a combined embodiment, may concurrently operate to each contribute a few semantically relevant standard operating procedure specifications for inclusion in a same linguistic prompt 141. For example after a single occurrence of step 301, step 302A may select standard operating procedure specification 121, step 302B may concurrently select standard operating procedure specification 122, and both standard operating procedure specifications 121-122 may be included in a same linguistic prompt 141. In embodiment B, with or without embodiment A, ML models 130 and 140 are collectively referred to herein as a hybrid model. That is, the hybrid model contains ML models 130 and 140.

In this example, remediation of the operational deficiency of network element 102 is complicated and entails an incrementally generated and processed sequence of multiple linguistic prompts 141-142 as discussed earlier herein. Although not generated together at a same time, linguistic prompts 141-142 are a) generated by network element 101 and b) accepted by LLM 140, and (a)-(b) occur in a same natural language interaction (NLI) conversation between LLM 140 and, for example, a user.

Between steps 302A or 302B and 303, steps 203-204 of FIG. 2 occur including generating linguistic prompt 141 and computer script 151 but, in this example, not yet generating linguistic prompt 142. In this example, inferred sequence of computer commands 152 contains an idempotent computer command that generates diagnostic numbers 143 that characterize the operational status of network element 102.

Step 204 of FIG. 2 interactively or automatically applies computer script 151 to network element 102, and computer script 151 may succeed or fail. If computer script 151 succeeds, step 303 occurs as discussed later herein. If computer script 151 instead fails, steps 304-305 occur as follows.

Step 304 receives failure indication 161 that indicates that computer script 151 failed. In an embodiment, step 305 responsively inserts failure indication 161 into trouble ticket 160 that may be newly generated by step 305 or preexisting. Later manually fixing a problem described by trouble ticket 160 may be part of continuous improvement of distributed system 100.

If computer script 151 instead succeeds, step 303 occurs as follows. Successful application of computer script 151 to network element 102 causes network element 102 to send results back to network element 101 including, in this example, diagnostic numbers 143 that network element 101 receives and includes in responsively generated linguistic prompt 142. Step 303 generates linguistic prompt 142 that contains diagnostic numbers 143, which causes LLM 140 to inferentially generate, from diagnostic numbers 143, a second computer script that is manually or automatically applied to network element 102. If the second script also succeeds, then the operational deficiency of network element 102 is remedied (i.e. eliminated or mitigated).

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
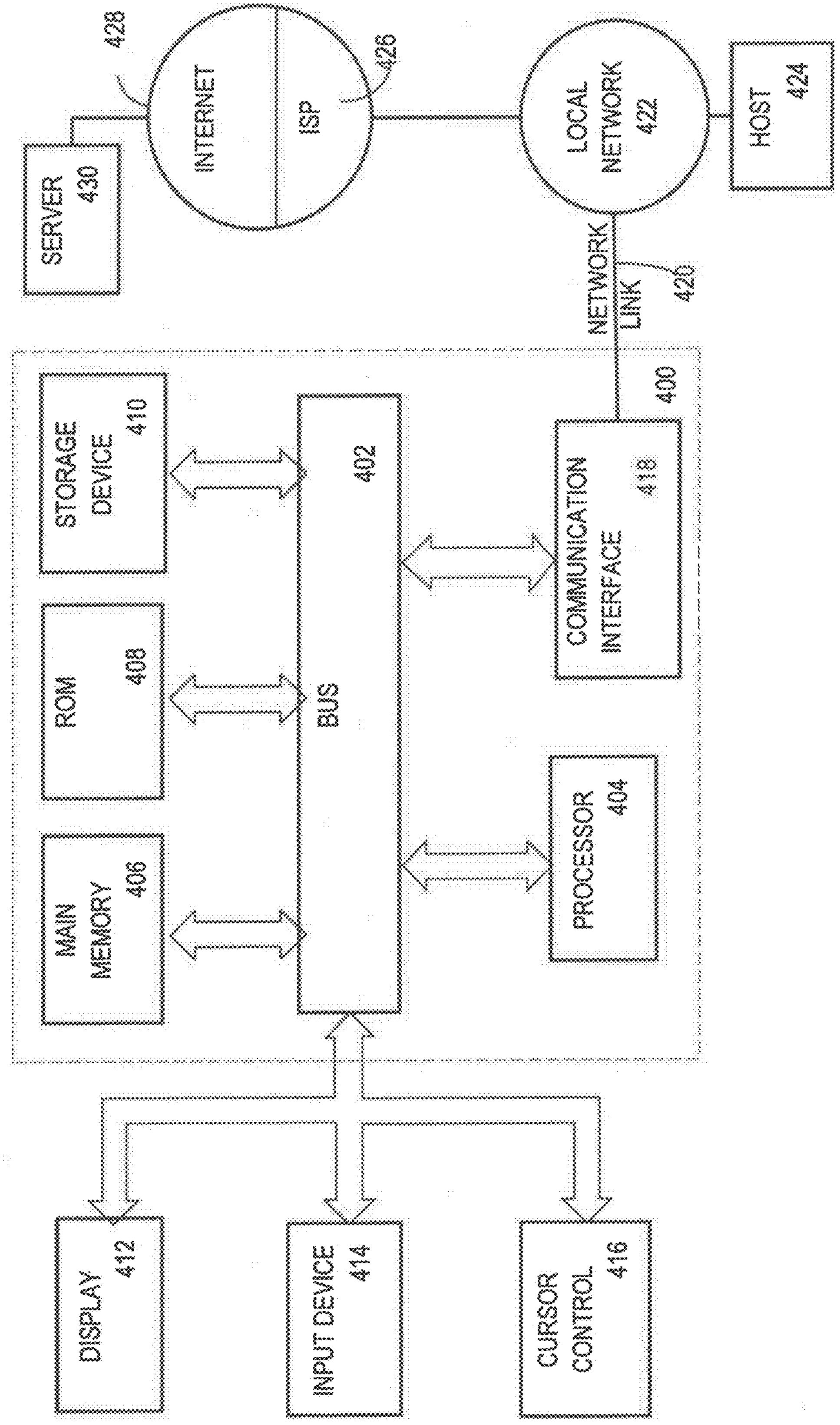
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet"428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
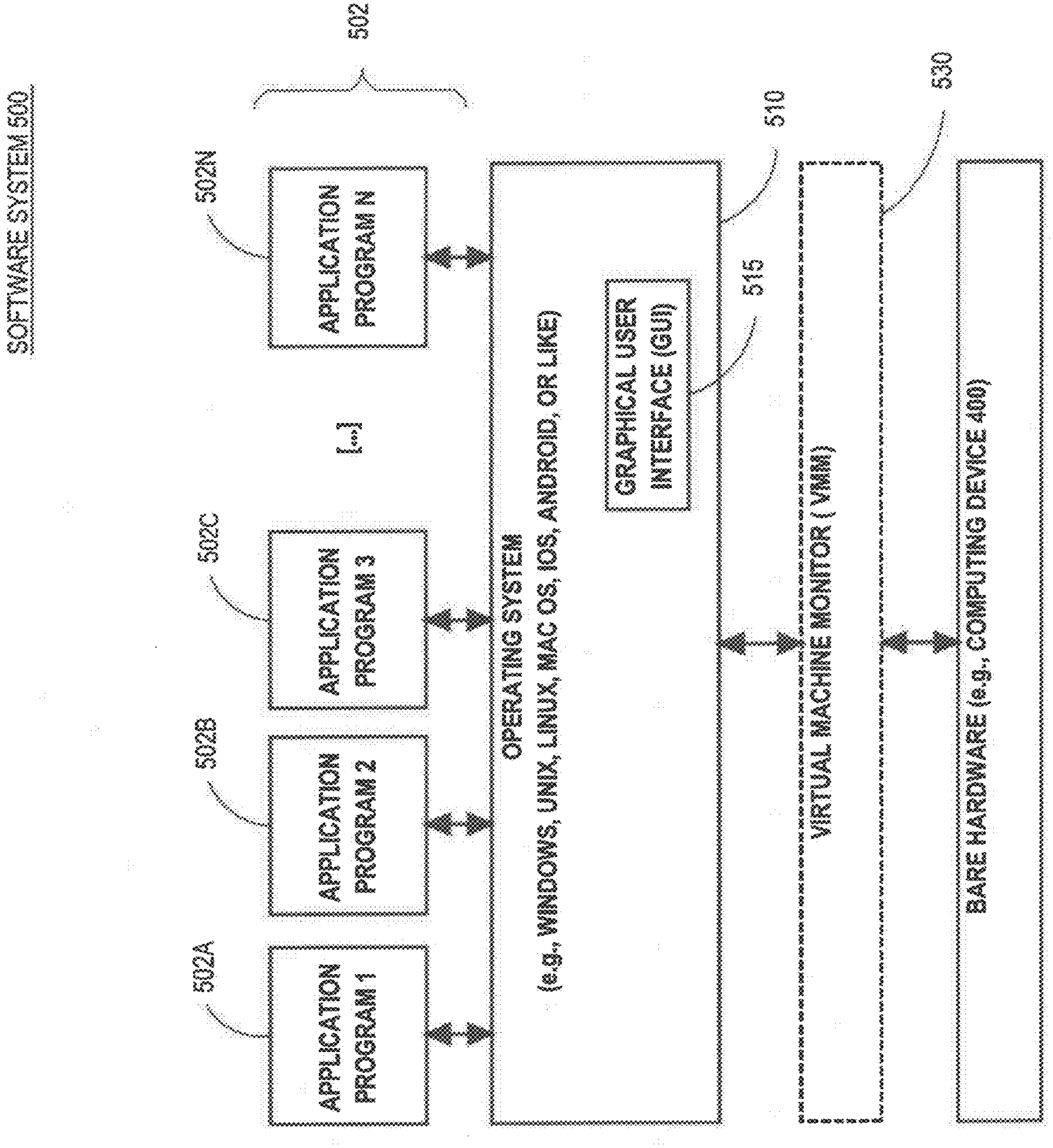
FIG. 5 is a block diagram that illustrates a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Inferencing entails a computer applying the machine learning model to an input such as a feature vector to generate an inference by processing the input and content of the machine learning model in an integrated way. Inferencing is data driven according to data, such as learned coefficients, that the machine learning model contains. Herein, this is referred to as inferencing by the machine learning model that, in practice, is execution by a computer of a machine learning algorithm that processes the machine learning model.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

receiving a deficiency text string that indicates an operational deficiency of a first network element;

selecting, based on the deficiency text string, a plurality of standard operating procedure specifications that each contains: a plurality of natural language sentences and a sequence of computer commands;

inferentially generating, by a large language model (LLM), from a linguistic prompt that contains the deficiency text string and the plurality of standard operating procedure specifications, a computer script that contains an inferred sequence of computer commands; and applying the computer script to the first network element to remedy the operational deficiency of the first network element;

wherein the method is performed by a second network element.

2. The method of claim 1 wherein said selecting comprises:

inferentially generating, by a second LLM, a fixed-size encoding of the deficiency text string;

selecting, based on a semantic lookup key, by a vector store that contains the plurality of standard operating procedure specifications, the fixed-size encoding of the deficiency text string.

3. The method of claim 1 wherein said selecting comprises:

inferentially generating, by a second LLM, a fixed-size encoding of the deficiency text string;

predicting, by a machine learning classifier, from the fixed-size encoding of the deficiency text string, a database table of a plurality of database tables, wherein the database table contains the plurality of standard operating procedure specifications.

4. The method of claim 1 wherein:

the deficiency text string contains an identifier of at least one of: the first network element, a network port of the first network element, and a computer that contains the first network element;

said inferentially generating comprises including said identifier in the inferred sequence of computer commands.

5. The method of claim 1 wherein:

said receiving comprising interactively receiving;

the deficiency text string is one selected from a group that consists of: a) a natural language question, b) natural language from: a trouble ticket, an instant message, or an email, c) a console error message, d) a sequence of text lines from a console log, e) a single lexical token, and f) a text string that does not contain an identifier of any of: the first network element, a network port of the first network element, and a computer that contains the first network element.

6. The method of claim 1 wherein said applying comprises:

receiving an indication of a failure of said applying;

inserting the indication of the failure of said applying into a new trouble ticket or an existing trouble ticket.

7. The method of claim 1 wherein:

the first network element is: a) a virtual machine or b) an executing image of a software application in a containerization container;

a stack trace is contained in each of the deficiency text string and the linguistic prompt.

8. The method of claim 1 wherein:

the inferred sequence of computer commands includes an idempotent command that outputs a plurality of diagnostic numbers that characterize a status of the first network element;

the method further comprises performing in a same natural language interaction (NLI) conversation:

said inferentially generating and generating a second linguistic prompt that contains the plurality of diagnostic numbers.

9. The method of claim 1 wherein the computer script is one selected from a group consisting of: a shell script, a python script, and a standard query language (SQL) script.

10. The method of claim 1 wherein:

the sequence of computer commands includes a previous computer command and a next computer command that are adjacent in the computer script;

the previous computer command and the next computer command are separated, in a standard operating procedure specification of the plurality of standard operating procedure specifications, by one or more natural language sentences.

11. The method of claim 1 wherein a computer command in the sequence of computer commands contains an argument value that is not contained in at least one selected from a group consisting of a vector store and the plurality of standard operating procedure specifications.

12. One or more computer-readable non-transitory media storing instructions that, when executed by one or more processors in a second network element, cause:

receiving a deficiency text string that indicates an operational deficiency of a first network element;

selecting, based on the deficiency text string, a plurality of standard operating procedure specifications that each contains: a plurality of natural language sentences and a sequence of computer commands;

inferentially generating, by a large language model (LLM), from a linguistic prompt that contains the deficiency text string and the plurality of standard operating procedure specifications, a computer script that contains an inferred sequence of computer commands; and applying the computer script to the first network element to remedy the operational deficiency of the first network element.

13. The one or more computer-readable non-transitory media of claim 12 wherein said selecting comprises:

inferentially generating, by a second LLM, a fixed-size encoding of the deficiency text string;

selecting, based on a semantic lookup key, by a vector store that contains the plurality of standard operating procedure specifications, the fixed-size encoding of the deficiency text string.

14. The one or more computer-readable non-transitory media of claim 12 wherein said selecting comprises:

inferentially generating, by a second LLM, a fixed-size encoding of the deficiency text string;

predicting, by a machine learning classifier, from the fixed-size encoding of the deficiency text string, a database table of a plurality of database tables, wherein the database table contains the plurality of standard operating procedure specifications.

15. The one or more computer-readable non-transitory media of claim 12 wherein:

the deficiency text string contains an identifier of at least one of: the first network element, a network port of the first network element, and a computer that contains the first network element;

said inferentially generating comprises including said identifier in the inferred sequence of computer commands.

16. The one or more computer-readable non-transitory media of claim 12 wherein:

said receiving comprising interactively receiving;

the deficiency text string is one selected from a group that consists of: a) a natural language question, b) natural language from: a trouble ticket, an instant message, or an email, c) a console error message, d) a sequence of text lines from a console log, e) a single lexical token, and f) a text string that does not contain an identifier of any of: the first network element, a network port of the first network element, and a computer that contains the first network element.

17. The one or more computer-readable non-transitory media of claim 12 wherein said applying comprises:

receiving an indication of a failure of said applying;

inserting the indication of the failure of said applying into a new trouble ticket or an existing trouble ticket.

18. The one or more computer-readable non-transitory media of claim 12 wherein:

the first network element is: a) a virtual machine or b) an executing image of a software application in a containerization container;

a stack trace is contained in each of the deficiency text string and the linguistic prompt.

19. The one or more computer-readable non-transitory media of claim 12 wherein:

the inferred sequence of computer commands includes an idempotent command that outputs a plurality of diagnostic numbers that characterize a status of the first network element;

said instructions further cause performing in a same natural language interaction (NLI) conversation:

said inferentially generating and generating a second linguistic prompt that contains the plurality of diagnostic numbers.

20. The one or more computer-readable non-transitory media of claim 12 wherein the computer script is one selected from a group consisting of: a shell script, a python script, and a standard query language (SQL) script.

* * * * *